(12) United States Patent
Marinkovich et al.

(10) Patent No.: US 7,929,766 B2
(45) Date of Patent: Apr. 19, 2011

(54) IDENTIFIERS FOR DIGITAL MEDIA

(75) Inventors: Mike Marinkovich, Santa Clara, CA (US); Greg Lindley, Sunnyvale, CA (US); Alan Cannistraro, San Francisco, CA (US); Evan Doll, San Francisco, CA (US); Gary Johnson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 984 days.

(21) Appl. No.: 11/760,713

(22) Filed: Jun. 8, 2007

(65) Prior Publication Data

US 2008/0304747 A1 Dec. 11, 2008

(51) Int. Cl.
*G06K 9/18* (2006.01)
*G06K 9/62* (2006.01)

(52) U.S. Cl. ........................................ 382/183; 382/209

(58) Field of Classification Search .................. 382/181, 382/183, 184, 209
See application file for complete search history.

(56) References Cited

U.S. PATENT DOCUMENTS

| 7,121,469 | B2 * | 10/2006 | Dorai et al. | 235/470 |
| 7,596,269 | B2 * | 9/2009 | King et al. | 382/177 |
| 7,606,741 | B2 * | 10/2009 | King et al. | 705/27 |
| 7,739,597 | B2 * | 6/2010 | Wong et al. | 715/721 |
| 2004/0099741 | A1 * | 5/2004 | Dorai et al. | 235/462.08 |
| 2004/0143598 | A1 * | 7/2004 | Drucker et al. | 707/104.1 |
| 2006/0178946 | A1 * | 8/2006 | Agarwal | 705/26 |
| 2007/0300142 | A1 * | 12/2007 | King et al. | 715/500 |

* cited by examiner

*Primary Examiner* — Jingge Wu
*Assistant Examiner* — Stephen R Koziol
(74) *Attorney, Agent, or Firm* — Fish & Richardson P.C.

(57) ABSTRACT

A computer-implemented method includes receiving a piece of content, wherein the piece of content comprises a machine-readable identifier, identifying the machine-readable identifier in the piece of content, and associating the machine-readable identifier to the piece of media content.

35 Claims, 6 Drawing Sheets

IDENTIFIERS FOR DIGITAL MEDIA

TECHNICAL FIELD

This disclosure relates to editing digital content, for example, digital images or videos.

BACKGROUND

Scenes in motion can be captured and recorded using a variety of devices ranging from state-of-the-art professional video cameras used in television and movie-making to simple cameras on cellular telephones. Some of the devices that can be used to capture motion pictures, including digital camcorders and digital cameras, allow storing the captured images in digital format including the moving picture experts group. (MPEG) format. Depending on device capabilities and user settings, a camera can capture and store both audio and video. The recorded information is automatically stored in digital format and can be easily transported to secondary devices including a hard disk of a computer using various wired or wireless communications protocols such as bluetooth or universal serial bus (USB).

Video editing software, such as iMovie HD 6.0.1, enables users to perform non-linear editing techniques on video footage. Such editing may include cutting segments of the footage, re-arranging segments of the same video clip, re-arranging and combining segments of multiple video clips, and/or modifying the captured content by adding or substituting other content including audio tracks, voice-overs, titles, and transitions between frames.

SUMMARY

In one example, a user can associate an item of digital content with a corresponding machine-readable identifier while capturing the content. Subsequently, when all the captured items of content and their corresponding machine-readable identifiers are uploaded to a system, the system can process each item of content based on the corresponding machine-readable identifier.

In one aspect, a computer implemented method of processing digital content is described. The method includes receiving an item of digital content, the received item including at least one machine-readable identifier that is embedded in and descriptive of the digital content, reading the machine-readable identifier embedded in the digital content, and processing the content in accordance with the one or more predetermined criteria associated with the read machine-readable identifier.

This, and other aspects, can include one or more of the following features. The method can further include generating the machine-readable identifier, and providing the generated machine-readable identifier for including in an item of digital content. The item of digital content can be a sequence of digital video frames. The reading can include scanning each frame in the sequence of digital video frames, comparing an image of the scanned frame with a stored image of the machine-readable identifier, and upon detecting that the image of the scanned frame matches the stored image, assigning the scanned image as the machine-readable identifier included in the item of digital content. The machine-readable identifier can include at least one of a bar code, a text, an image, a number, and audio signal, and an alphanumeric character. The machine-readable identifier can be positioned at any arbitrary point in the digital content. The processing can include arranging the item of digital content relative to other processed items of digital content. The processing can include storing the item of digital content in a repository. The processing can include editing the item of digital content. The item of digital content can correspond to a section of a template. The machine-readable identifier embedded in the item of digital content can correspond to the section of the template. The method can further include associating the item of digital content to the section of the template to which the machine-readable identifier corresponds.

In another aspect, a medium bearing instructions to enable one or more machines to perform operations is described the operations include receiving an item of digital content, the received item including at least one machine-readable identifier that is embedded in and descriptive of the digital content, reading the machine-readable identifier embedded in the digital content, and processing the content in accordance with the one or more predetermined criteria associated with the read machine-readable identifier.

This, and other aspects, can include one or more of the following features. The operations can further include generating the machine-readable identifier, and providing the generated machine-readable identifier for including in an item of digital content. The item of digital content can be a sequence of digital video frames. The reading can include scanning each frame in the sequence of digital video frames, comparing an image of the scanned frame with a stored image of the machine-readable identifier, and upon detecting that the image of the scanned frame matches the stored image, assigning the scanned image as the machine-readable identifier included in the item of digital content. The machine-readable identifier can include at least one of a bar code, a text, an image, a number, and audio signal, and an alphanumeric character. The machine-readable identifier can be positioned at any arbitrary point in the digital content. The processing can include arranging the item of digital content relative to other processed items of digital content. The processing can include storing the item of digital content in a repository. The processing can include editing the item of digital content. The item of digital content can correspond to a section of a template. The machine-readable identifier embedded in the item of digital content can correspond to the section of the template. The operations can further include associating the item of digital content to the section of the template to which the machine-readable identifier corresponds.

The systems and techniques described here can present one or more of the following advantages. Placing machine-readable identifiers in recorded digital content can enable easy identification of the content during editing. Tagging the machine-readable identifiers with metadata can enable performing operations—such as grouping, editing, and the like—on all items of content corresponding to the same machine-readable identifier. Presenting a user with a template that the user can use to record content can assist an average user, who is unaware of the nuances of story telling, and thus to record content that the user can later use during editing to create a near-professional finished video. When the templates for story telling are created, the machine-readable identifier associated with each section of the template can simplify the editing process after the content is recorded. These features can make using software for editing digital content simple to use for an average user while providing a near-professional quality to the finished content.

The details of one or more implementations are set forth in the accompanying drawings and the description below. Other

DESCRIPTION OF DRAWINGS

Like reference symbols in the various drawings indicate like elements.

DETAILED DESCRIPTION

Figure 1:
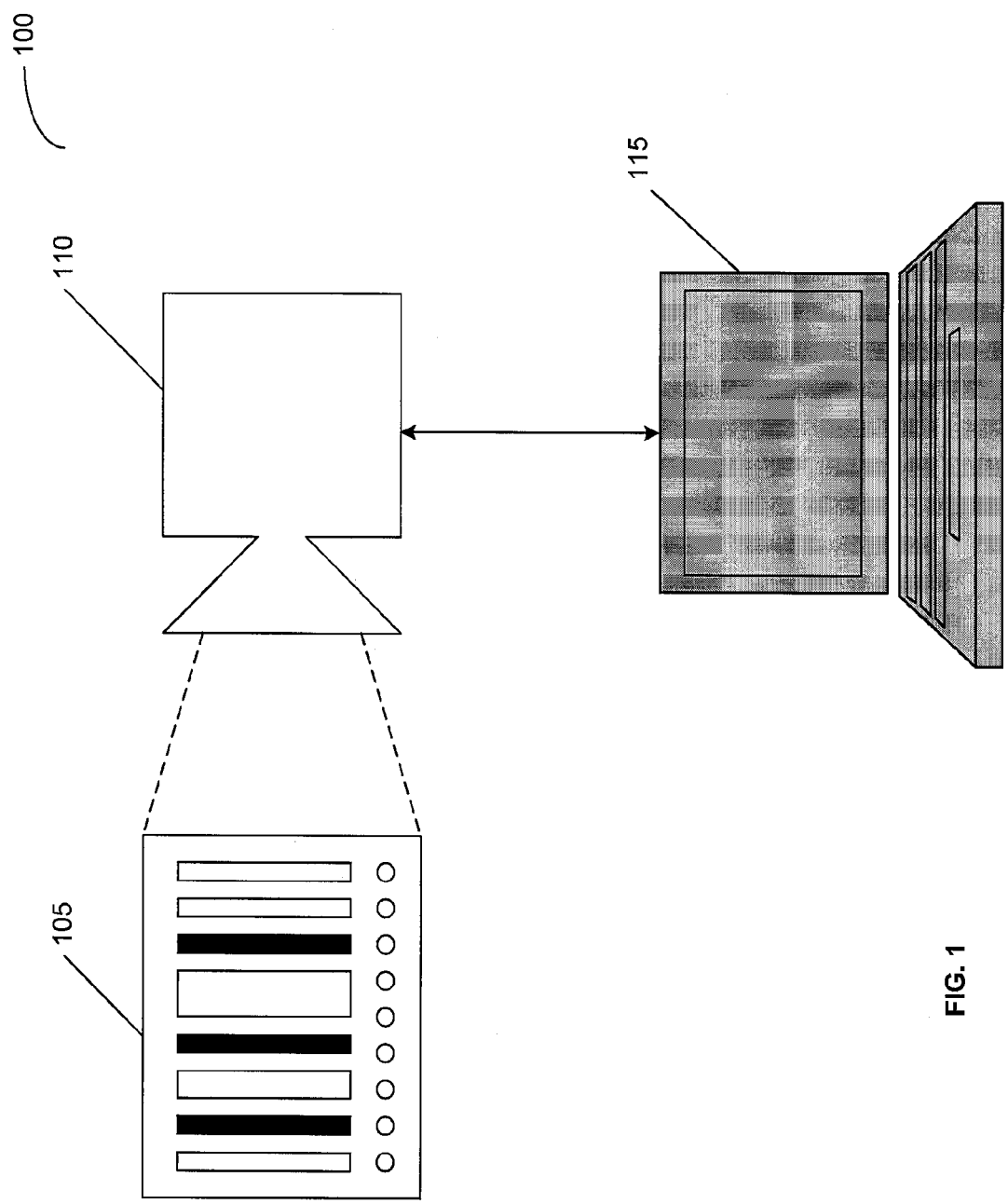
FIG. 1 is a schematic of an example of a system for associating machine-readable identifiers with items of digital content.

FIG. 1 depicts a schematic of an example of a system 100 for associating machine-readable identifiers with items of digital content recorded using any suitable recording instrument. The system 100 can include a machine-readable identifier 105, a content capturing instrument 110 with which both the machine-readable identifier 105 and digital content can be recorded, and a computer system 115 for storing the machine-readable identifier and the digital content. In some implementations, the machine-readable identifier 105 can be similar to a bar code where the arrangement of symbols (e.g., lines, circles, and the like) can be unique to each machine-readable identifier 105. The instrument 110 can be virtually any device capable of recording digital content, e.g., video cameras, digital cameras, cellular telephones, and the like. The computer system 115 can be any suitable system (e.g., desktop computer, laptop computer, personal digital assistant (PDA), smartphone, work station). Video editing software can be installed on the computer system 115. Alternatively, the computer system 115 can receive the content from the instrument 110 and transmit the content to an external system on which the video editing software can be installed. In some implementations, a user first records the machine-readable identifier 105 using the instrument 110 and, subsequently, records items of digital content. The digital content can include one or more of video, audio, and images. The user can upload the machine-readable identifier 105 and the recorded items of digital content, captured using the instrument 110, into a video editing software user interface (UI) installed on the computer system 115. The machine-readable identifiers 105 associated with each item of recorded content can enable a user and/or the computer system 115 to perform operations on the recorded content such as identification, grouping, viewing, editing, and the like.

Figure 2:
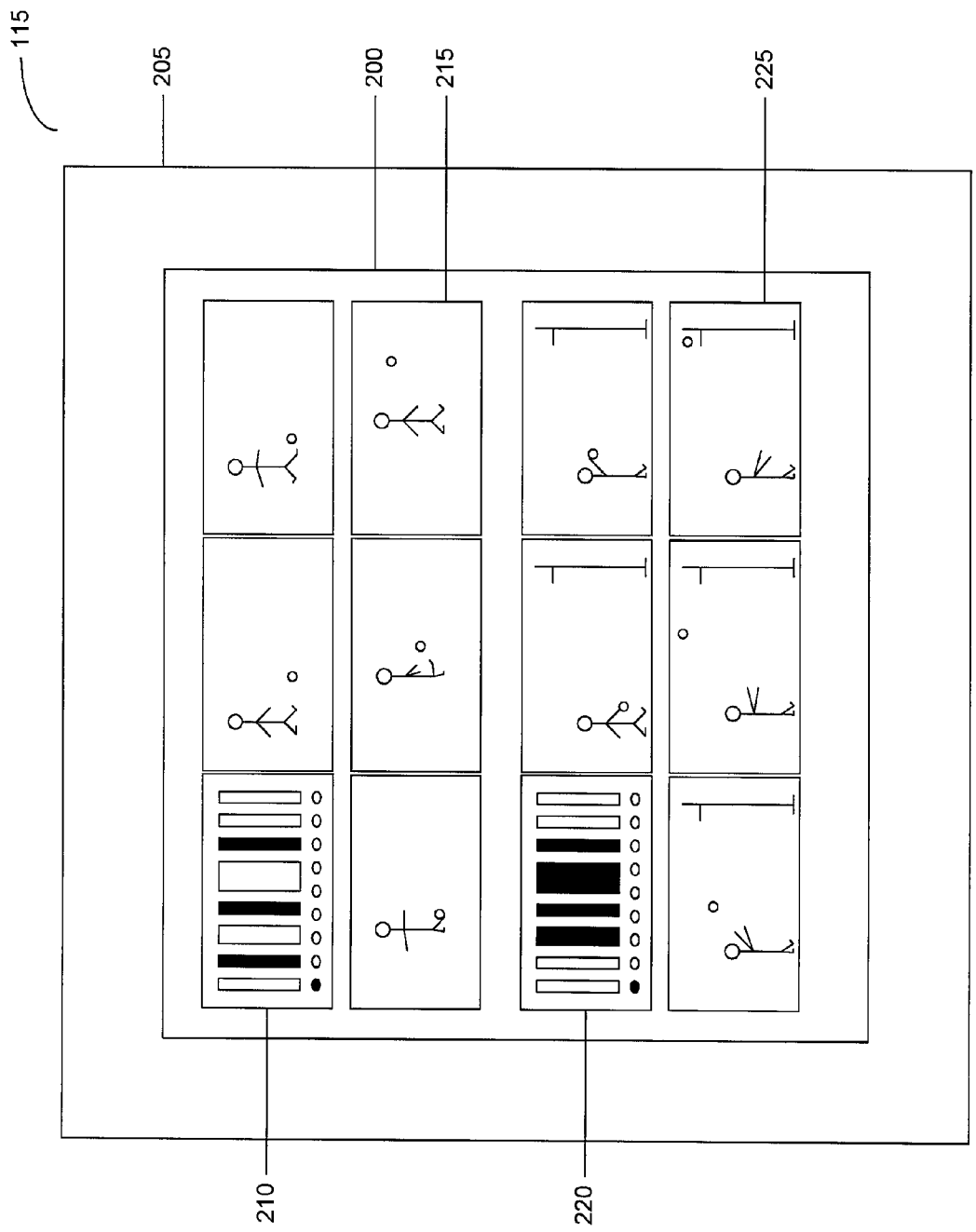
FIG. 2 is a schematic of a user interface displaying digital content on a display device.

FIG. 2 depicts a schematic of a UI 200 displaying digital content on the display device 205 of the computer system 115. In some implementations, prior to recording video using the instrument 110, a machine-readable identifier 210, e.g., a bar code, can be placed in the recorded footage and stored as one or more frames. For example, the user can record an image of the machine-readable identifier 210 by placing the image in front of the instrument 110 and recording the image. Subsequently, the user can record video, which can be stored as a sequence of frames 215. Upon completing the sequence and prior to recording a new sequence, a second machine-readable identifier 220 can be placed in the recorded footage and stored as one or more frames. Then, the user can record the new sequence of video frames 225. In this manner, the user can place a machine-readable identifier with each sequence of video frames, thereby associating the machine-readable identifier to and enabling identification of each sequence. In other implementations, the user can first record the video sequence and, subsequently, record the machine-readable identifier. This can enable identifying a sequence after the sequence has been recorded.

In some implementations, the user can create the machine-readable identifier 105, e.g., by drawing the machine-readable identifier 105, e.g., on a sheet of paper, holding the machine-readable identifier 105 up to the instrument 110 and recording the machine-readable identifier 105. In other implementations, the video editing software, into which the recorded footage is uploaded, can present the user with one or more machine-readable identifiers 105. The user can print the machine-readable identifiers 105 using, e.g., a printer, hold the machine-readable identifier 105 up to the instrument 110 and record the machine-readable identifier. Alternatively, the computer system 115, on which the video editing software is installed, can transmit the machine-readable identifiers 105 to the instrument 110. The instrument 110 can include functionalities to place a machine-readable identifier 105 with each sequence of video based on user input and interaction. The instrument 110 can include machine-readable identifiers which the instrument 110 can place with the content automatically or based on user input or both. The instrument 110 can transmit the machine-readable identifiers to the computer system 115 when the recorded content is transferred to the computer system 115. In some implementations, the video editing software can be configured to recognize sequence of frames based on start and stop points in the recorded video footage, when the footage is uploaded into the UI 205 on the computer system 115. Upon recognizing sequences of frames, the video editing software can be configured to place a machine-readable identifier 105 with each sequence based on user input and interaction. The user input and interaction can include displaying a recommended machine-readable identifier to a user for the user for user approval, associating the recommended machine-readable identifier to the sequence of frames upon receiving approval, asking for a user defined machine-readable identifier, asking if no machine-readable identifier is required, and the like. In some implementations, audio input sequences emitted by a device, e.g., the sound of numbers dialed on a phone, can be sent from the device to the machine. For example, the device can be held adjacent to the instrument and the emitted sound can be recorded. The device can be configured to emit sounds that are unique so that each unique sound can be an identifier. Subsequently, content, such as documents, e.g., a movie script, can be associated with the audio sequences in the recorded signal.

Figure 3:
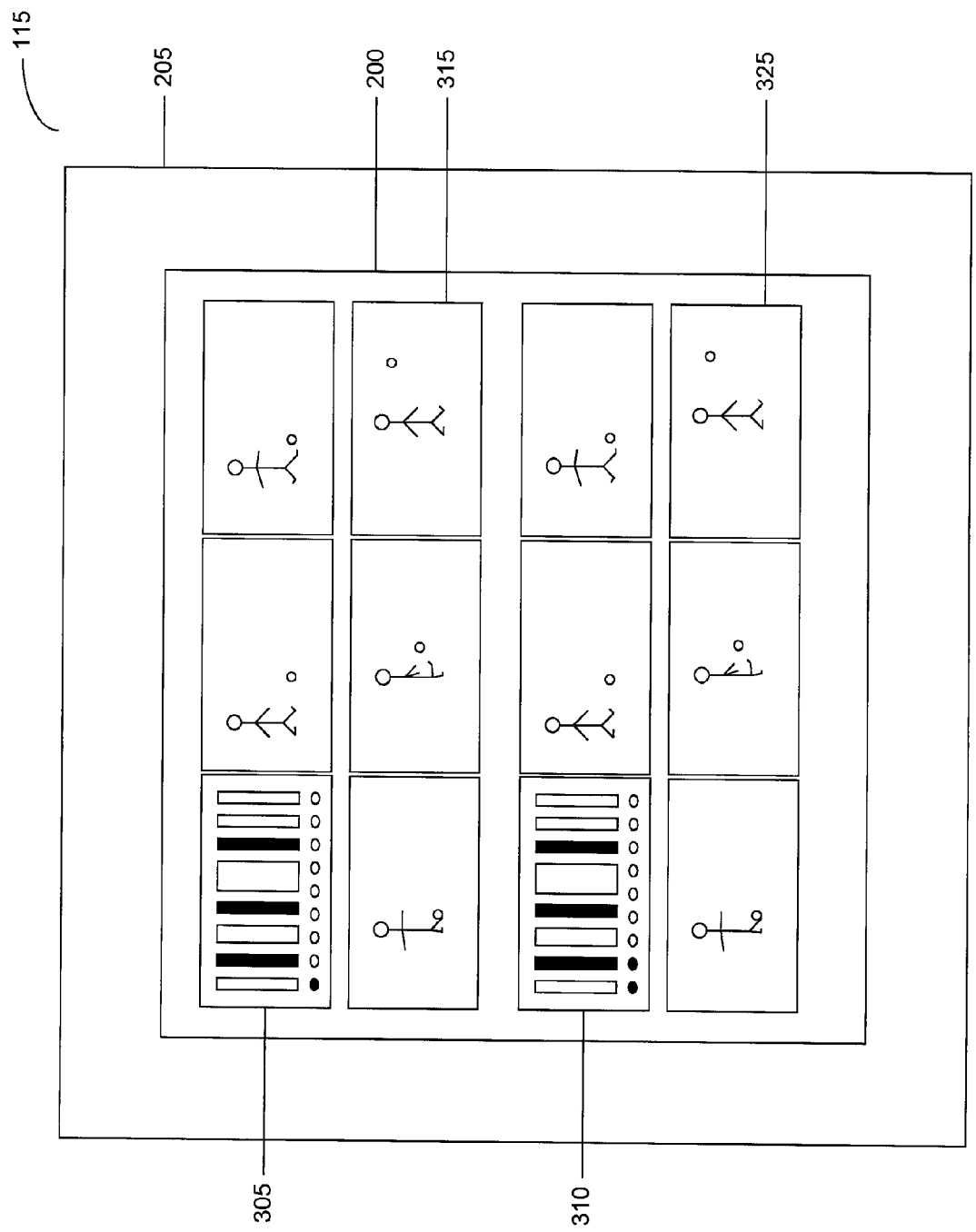
FIG. 3 is a schematic of a user interface displaying digital content on a display device.

FIG. 3 depicts a schematic of a UI 200 displaying digital content on the display device 205 of the computer system 115. In some implementations, the user can create machine-readable identifiers to group two or more sequences of related video frames. For example, the user can record a first sequence of video frames as a first take, a second sequence of video frames as a second take, and so on, where all the frames contain the same or similar content. Since each sequence of video frames relates to the same or similar content, the machine-readable identifiers associated with each sequence can include a common representation. In FIG. 3, the sequence of frames 315 and the sequence of frames 325 are represented by machine-readable identifiers 305 and 310, respectively. The machine-readable identifiers 305 and 310 share a common representation, except one of the circles in machine-readable identifier 305 is filled, indicating a first take, while two of the circles in machine-readable identifier 310 are filled, indicating a second take. In this manner, when a user records two or more sequences of the same or similar content, the user can associate machine-readable identifiers that share a common representation, but are still distinguishable. Once the content with which machine-readable identifiers 305 and 310 are received, the computer system 115 can further be configured to recognize that since the representations on machine-readable identifiers 305 and 310 are similar, the content is related. The computer system 115 can further be configured to recognize that since one circle in machine-readable identifier 305 is filled and two circles in machine-readable identifier 310 are filled, the content with which these machine-readable identifiers are associated represent a first take and a second take, respectively. The computer system 115 can group the content accordingly. In implementations where bar codes with filled circles are used, the computer system 115 can be configured to recognize the filled and unfilled circles based on image analysis techniques including optical character recognition (OCR), difference in contrast levels, and the like. In some implementations, the video editing software can be recognized by methods such as pattern recognition.

Figure 4:
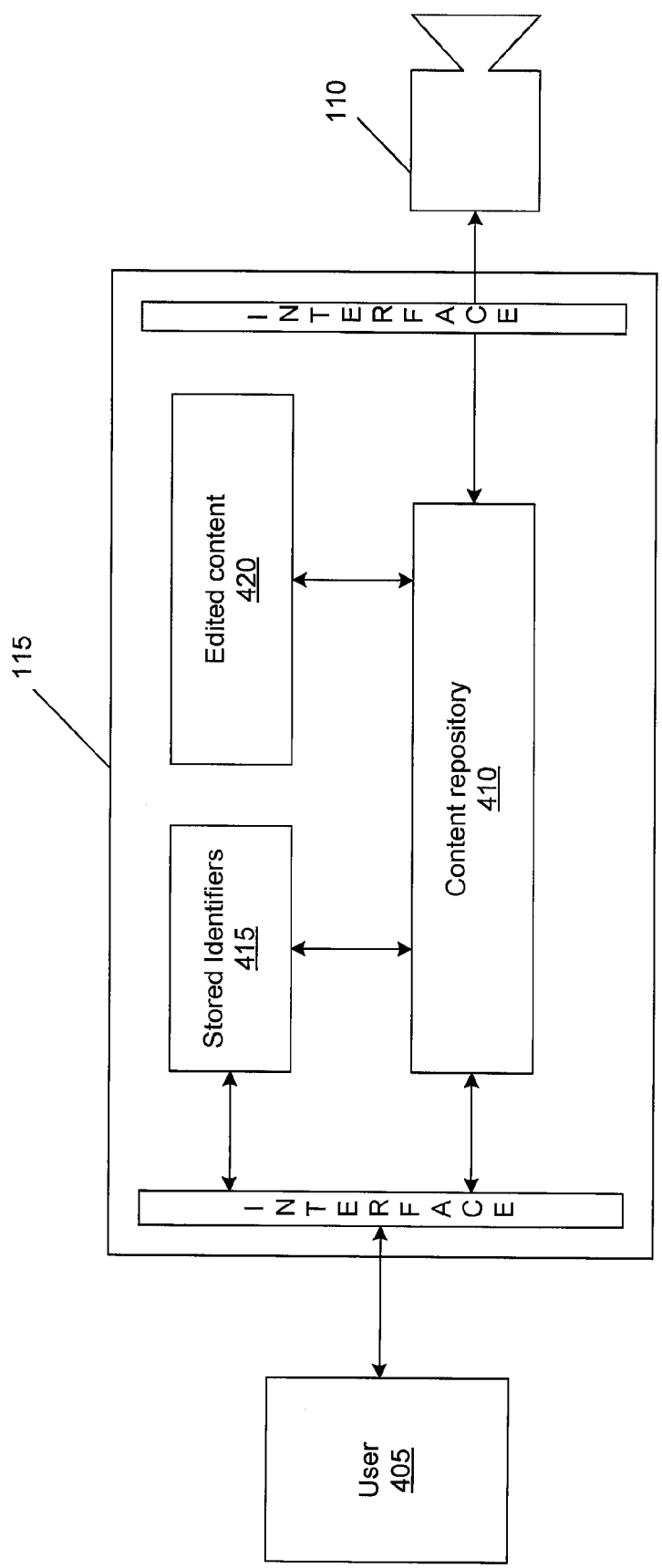
FIG. 4 is a schematic of an example of a computer system for processing digital content with associated machine-readable identifiers.

FIG. 4 depicts a schematic of an example of a computer system 115 for processing digital content with associated machine-readable identifiers. In some implementations, a user can record digital content, e.g., sequences of video frames, using an instrument 110, e.g., a video camera, a digital camera, a cellular telephone, and the like. The computer system 115 can receive the recorded content from the instrument 110 through an interface and store the content in the content repository 410. In implementations where the content includes one or more sequences of video frames, the user can associate a machine-readable identifier 105 with each sequence. In some implementations, the user 405 can record video content using the instrument 110, transfer the video content and the associated machine-readable identifiers to the computer system 115, and view the content on the UI 200 on the display device 205 of the computer system 115. In some implementations, the user 405 can use stored machine-readable identifiers 415 provided by the video editing software installed in the computer system 115 to associate to the recorded sequence of video frames. In other implementations, the user 405 can create their own machine-readable identifiers 105. The user can place the machine-readable identifiers 105 with the sequences of frames and store a copy of the created machine-readable identifiers 105 in stored machine-readable identifiers 415. In such implementations, the computer system 115 can be configured to locate the machine-readable identifiers 105 from among in the content repository 410, match the located machine-readable identifier 105 with the corresponding machine-readable identifier 105 in the stored machine-readable identifiers 105, and associate the machine-readable identifier in the stored machine-readable identifiers 415 with the sequence of frames in the content repository 410 to which the machine-readable identifier 105 was associated.

In some implementations, while editing the content stored in the content repository 410, the user 405 can associate metadata to the machine-readable identifiers 105 in stored machine-readable identifiers 415. For example, if the user 405 records content for a week and associates a machine-readable identifier 105 for each day of the week, the user 405 can associate the day of the week as the metadata for each machine-readable identifier 105. In some implementations, the user 405 can retrieve each machine-readable identifier 105 in the stored machine-readable identifiers 415 to associate the metadata. In other implementations, the user 405 can create machine-readable identifiers 105 that include metadata in the representation. For example, a machine-readable identifier 105 can include the date, time, and location of recording in the body of the machine-readable identifier 105 in addition to the machine-readable identifier's unique representation. When the user 405 records the machine-readable identifier 105, this metadata can also be recorded and placed along with the sequence of frames to which the machine-readable identifier 105 is associated. The computer system 115 can be configured to recognize the metadata in the body of the machine-readable identifier 105 by methods including OCR. Thus, the metadata associated with each machine-readable identifier 105 can not only be associated with each machine-readable identifier 105 in the stored machine-readable identifiers 415 but it can also be placed in the body of the machine-readable identifier 105 and automatically recognized by the computer system 115 during editing. Subsequent to editing, the content can be stored in edited content 420.

Figure 5:
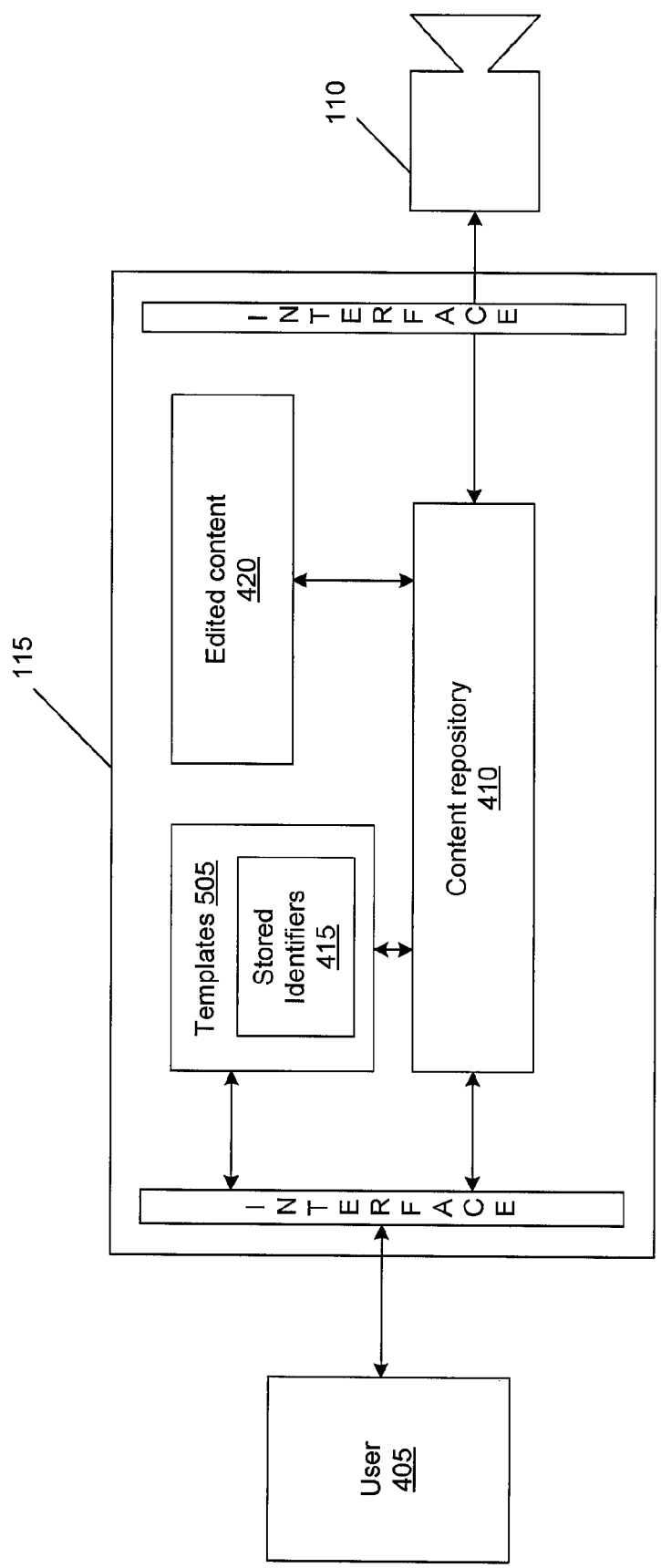
FIG. 5 is a schematic of an example of a computer system including templates.

FIG. 5 depicts a schematic of an example of a computer system 115 including templates 505 that can serve as suggestions to a user 405 recording digital content. The templates 505 can present the user 405 with suggestions based on which the user 405 can record digital content, e.g., video. Each template 505 can be related to a theme, e.g., a wedding, a bachelor party, a soccer game, and the like. For example, if the user 405 wishes to record a soccer game, the user can select, e.g., the soccer template. The soccer template can include one or more sections, each of which can be an event that frequently occurs in a soccer game. For example, the sections in the soccer template can include" "First half" "Half time," "Second half," "Over time," and the like, that are events that will occur in a soccer game. In addition, the soccer template can include sections such as "Warm up," "Penalty shoot out," and the like, that may be events related to a soccer game, but may or may not occur during the game. The video editing software can be configured to present the sections of the template 505 to a user, thereby providing the user with a story outline. The user can record video based on the story outline, edit the item of content associated with each section of the template, and create a project that can describe a soccer game as a story. In this manner, the video editing software can be configured to assist an average user of a recording instrument, who may be unaware of the nuances of story telling, to convert raw recorded footage into a project with a story line.

In some implementations, each section of each template 505 can include a machine-readable identifier 105. When the user 405 selects a theme, the user can be presented with each section as well as the corresponding machine-readable identifier 105 for the section. The machine-readable identifiers 105 can be stored in the computer system 115 under stored machine-readable identifiers 415. The user 405 can record content based on the suggestions provided by each section of the template. The suggestions can be the title of each section. For example, the title of a section can be "Warm up." Alternatively, or in addition, the suggestion can be a line of text displayed on each section, e.g., "Record team warm up." The machine-readable identifier 105 corresponding to a section can be automatically placed with the sequence of frames recorded for the section. In some implementations, the user 405 can generate hard copies of the machine-readable identifiers and record the representation on the hard copies using the instrument 110 by, e.g., positioning the hard copies in front of the instrument 110 and recording the machine-readable identifier 105 as one or more frames. Alternatively, the video editing software can be configured to transmit the machine-readable identifiers to the instrument 110 and the instrument 110 can be configured to place the machine-readable identifier 105 with the section containing recorded content to which the machine-readable identifier 105 corresponds. In other implementations, the recorded content can be received from the instrument 110 via an interface and stored in the content repository 410. The recorded content can include metadata that describes the section of the template to which the content is related. Upon receiving the metadata, the video editing software can be configured to automatically associate the machine-readable identifiers 105, in stored machine-readable identifiers 415, corresponding to each section to the content related to the section.

In some implementations, templates can be pre-generated and included in the video editing software. The themes of the pre-generated templates can be frequently occurring events where recording instruments are used, e.g., a wedding, graduation, and the like. In addition to the sections included in each pre-determined template, a user can add their own section. For example, in the soccer game, the user can include one or more sections titled "Pass before goal," "The goal," and the like. The user can create these sections prior to recording the content and include the created sections in the template 505. The video editing software can be configured to generate a machine-readable identifier 105 for each created section. When the user 405 records, in this example, the soccer game, the additional sections can be presented to the user 405. If the user 405 relates the recorded content to the created section, then the generated machine-readable identifier 105 is associated with the content of the new section. In this manner, user generated sections can be added to sections in the system generated templates.

In other implementations, the user 405 can generate a template and all the sections associated with the template. The user 405 can outline a story prior to recording any footage, create a section for each outline, and combine the sections as a template. The video editing software can be configured to automatically create a machine-readable identifier 105 for each user-created section and store the machine-readable identifiers 105 in the stored machine-readable identifiers 415. Alternatively, in addition to creating the sections, the user can also create machine-readable identifiers for each section and store the machine-readable identifiers 105 in the stored machine-readable identifiers 415. The user 405 can then record content based on the user-created sections and the machine-readable identifiers 105, either system generated or user-created, can be placed with the recorded content of each section.

Figure 6:
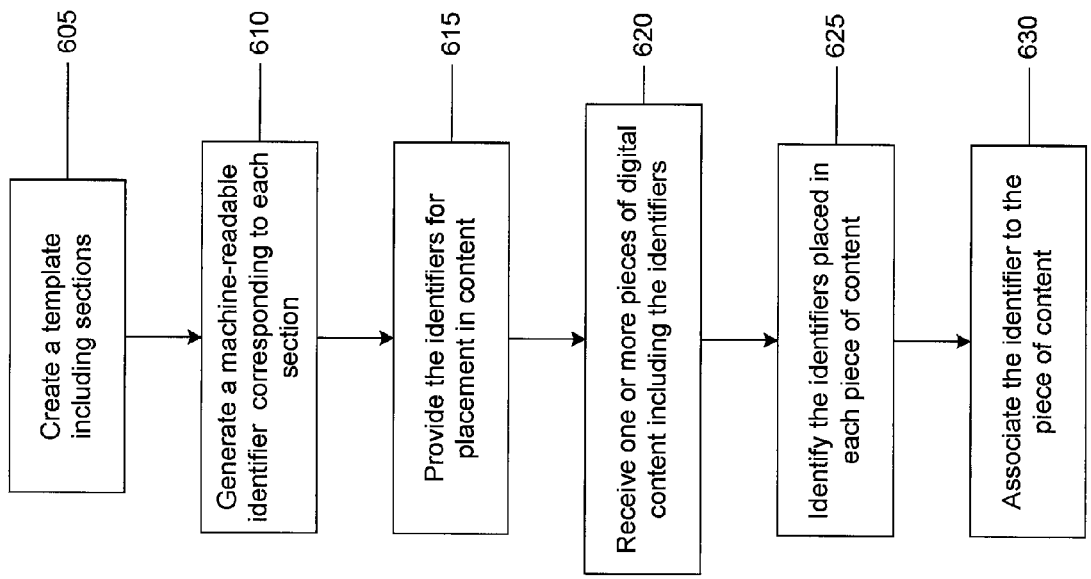
FIG. 6 is a flow chart of an example of a process for associating machine-readable identifiers with items of content.

FIG. 6 depicts a flow chart of an example of a process for associating machine-readable identifiers with items of content. A template describing, e.g., a story line, that includes one or more sections, can be created at 605. In some implementations, the story line can be guide to a user planning to record digital content, e.g., video, images, and the like, at an event. The template can include one or more sections, where each section can refer to occurrences at the event at which the user plans to record digital content. For example, if the user plans to record a soccer game, the template can be the story outline of a soccer game, while each section can refer to events, e.g., first half, second half, half time, and the like, that occur in a soccer game. In addition, the user can create sections and include the created sections in the template.

A machine-readable identifier corresponding to each section can be generated at 610. The machine-readable identifier can include a unique representation that corresponds to each section in the template. In some implementations, the machine-readable identifier can be represented by a bar code and can further include numbered circles. The machine-readable identifier can be generated by a user, generated by a computer system, or both. The machine-readable identifiers can be provided for placement in content at 615. The machine-readable identifiers can be provided to a user or transmitted to a recording instrument or both. In some implementations, the user can print one or more hard copies of each machine-readable identifier for placement in the content. In other implementations, the recording instrument, to which the machine-readable identifiers are transmitted, can be configured to place the machine-readable identifiers with the content corresponding to a section. For example, penalty shootout can be a section of the soccer game template. The user can print a hard copy of the machine-readable identifier that corresponds to the penalty shootout section of the soccer game, position the machine-readable identifier in front of a recording instrument, e.g., a video camera, a digital camera, a cellular telephone, and the like, record the machine-readable identifier and, subsequently, record the penalty shootout in the soccer game. Alternatively, upon receiving instructions from the user to record the penalty shootout in the soccer game, the recording instrument can be configured to place the corresponding machine-readable identifier among the video frames of the related to the penalty shootout.

The user can record one or more items of content that include machine-readable identifiers, which can be received at 620. In some implementations, all the items of content, regardless of the presence or absence of machine-readable identifiers, can be pulled from the recording instrument. In other implementations, select items of content that include machine-readable identifiers can be pushed either automatically by the recording instrument or by the user or both. The machine-readable identifiers in each item of content can be identified at 625. The machine-readable identifiers provided at 615 can be stored. In implementations where the content is video, each frame of each video file can be scanned until the contents of a frame match that of the machine-readable identifier stored in memory. For example, a machine-readable identifier can be identified by matching the sequence of bars on a recorded frame of video to the sequence of bars of a stored machine-readable identifier. In some implementations, the representations on the machine-readable identifier can be recognized by recognition techniques such as OCR. In some implementations, the machine-readable identifier can be identified by pattern recognition analyzed on a per-frame basis. Having identified the machine-readable identifier in a item of content, the machine-readable identifier can be associated with the item of content at 630. Since the machine-readable identifier corresponds to a section of the template, the item of content can be associated with a section, and can be manipulated accordingly. The manipulations can include storing the item of content at a location designated for the section, automatically playing the item of content when a request to play content associated with a section is received, presenting, for editing, the content associated with a section, grouping all content related to a section, editing the content of a section, and the like.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the specification. For example, the machine-readable identifier can include virtually any distinguishable representation such as numbers, letters, alphanumeric characters, spoken audio, sounds, or any combinations of the same. In some implementations, a machine-readable identifier can be a sequence of two numbers, e.g., "2.3", where "2" refers to the section number and "3" refers to the take number. In some implementations, the video editing software can be configured to scan the contents of a series of frames, recognize that the series shares, e.g., a common background, and recommend to the user that the series be grouped under one section. In some implementations, the machine-readable identifier of each section of a template can be associated with metadata prior to providing the machine-readable identifier for placement in content. The metadata associated with a machine-readable identifier can be used to manipulate the items of content once the content is received. The metadata can be specified by the user or the computer system or both.

In some implementations, the content can be images. For example, the user can take a picture of a first machine-readable identifier, take pictures of desired images, take a picture of a second machine-readable identifier, take more pictures, and so on. When the images are loaded into the computer system, the system can scan the contents of each image to identify each machine-readable identifier, group all images between the first and second machine-readable identifier, and associate the images with the first machine-readable identifier. Alternatively, the computer system can present to the user, the group of images, an image of the machine-readable identifiers, and request the user to select a machine-readable identifier to which the group of images can be associated. Once the images are associated with the machine-readable identifier, the images can be manipulated as a group. Similarly, the content can also include audio files and virtually any type of digital media.

In some implementations, the user can create machine-readable identifiers for each section of each template. For example, if the user wishes to use a machine-readable identifier different from the one generated by the system, the user can create their own machine-readable identifier and associate the user-created machine-readable identifiers with each section of the template. In some implementations, the user can create machine-readable identifiers, scan the machine-readable identifiers to create digital images, e.g., using scanners, and upload the scanned images into the computer system for use as machine-readable identifiers. In other implementations, the computer system can include a camera which the user can use to capture an image of the user-created machine-readable identifier and, subsequently, associate with each section of the template. In other implementations, a user can create a machine-readable identifier using any desired application, e.g., a drawing software, and import the drawing into the video editing software for use as a machine-readable identifier. In some implementations, the user can record the machine-readable identifier using the computer system, record the content using the recording instrument, and synchronize the recordings when the content from the recording instrument is received. In some implementations, a user viewing the recorded content, can view the machine-readable identifiers included in the content, and perform editing operations, such as grouping content based on the machine-readable identifiers. In some implementations, a user can replace the groupings of the computer system with user-defined groupings. Accordingly, other embodiments are within the scope of the following claims.

What is claimed is:

1. A computer-implemented method of processing digital content, the method comprising:
   receiving an item of digital content, the received item corresponding to a section of a template, the template being configured to provide guidance for recording content relating to successive events, the received item including a machine-readable identifier that is embedded in and descriptive of the digital content such that the machine-readable identifier embedded in the item of digital content corresponds to the section of the template;
   reading the machine-readable identifier embedded in the digital content;
   associating the received item of digital content to the section of the template to which the read machine-readable identifier corresponds; and
   processing the content of the associated item in accordance with one or more pre-determined criteria associated with the read machine-readable identifier.

2. The method of claim 1 further comprising:
   generating the machine-readable identifier; and
   providing the generated machine-readable identifier for including in the item of digital content.

3. The method of claim 1, wherein the item of digital content is a sequence of digital video frames.

4. The method of claim 3, wherein the reading comprises:
   scanning each frame in the sequence of digital video frames;
   comparing an image of the scanned frame with a stored image of the machine-readable identifier; and
   upon detecting that the image of the scanned frame matches the stored image, assigning the scanned image as the machine-readable identifier included in the item of digital content.

5. The method of claim 1, wherein the machine-readable identifier includes at least one of a bar code, a text, a number, an image, an audio signal, and an alphanumeric character.

6. The method of claim 1, wherein the machine-readable identifier is positioned at an arbitrary point in the digital content.

7. The method of claim 1, wherein the processing includes arranging the item of digital content relative to other processed items of digital content.

8. The method of claim 1, wherein the processing includes storing the item of digital content in a repository.

9. The method of claim 1, wherein the processing includes editing the item of digital content.

10. A non-transitory computer-readable medium bearing instructions to enable one or more machines to perform operations comprising:
    receiving an item of digital content, the received item corresponding to a section of a template, the template being configured to provide guidance for recording content relating to successive events, the received item including a machine-readable identifier that is embedded in and descriptive of the digital content such that the machine-readable identifier embedded in the item of digital content corresponds to the section of the template;
    reading the machine-readable identifier embedded in the digital content;
    associating the received item of digital content to the section of the template to which the read machine-readable identifier corresponds; and processing the content of the associated item in accordance with one or more pre-determined criteria associated with the read machine-readable identifier.

11. The non-transitory computer-readable medium of claim 10 further comprising:
generating the machine-readable identifier; and
providing the generated machine-readable identifier for including in an item of digital content.

12. The non-transitory computer-readable medium of claim 10 wherein the item of digital content is a sequence of digital video frames.

13. The non-transitory computer-readable medium of claim 12, wherein the reading comprises:
scanning each frame in the sequence of digital video frames;
comparing an image of the scanned frame with a stored image of the machine-readable identifier; and
upon detecting that the image of the scanned frame matches the stored image, assigning the scanned image as the machine-readable identifier included in the item of digital content.

14. The non-transitory computer-readable medium of claim 13, wherein the machine-readable identifier includes at least one of a bar code, a text, a number, an image, an audio signal, and an alphanumeric character.

15. The non-transitory computer-readable medium of claim 10, wherein the machine-readable identifier is positioned at an arbitrary point in the digital content.

16. The non-transitory computer-readable medium of claim 10, wherein the processing includes arranging the item of digital content relative to other processed items of digital content.

17. The non-transitory computer-readable medium of claim 10, wherein the processing includes storing the item of digital content in a repository.

18. The non-transitory computer-readable medium of claim 10, wherein the processing includes editing the item of digital content.

19. The method of claim 1, wherein a template configuration includes a story line.

20. The method of claim 19, wherein the template includes one or more sections corresponding to respective events of the story line.

21. The method of claim 1, wherein the template configuration includes a theme.

22. The non-transitory computer-readable medium of claim 10, wherein a template configuration includes a story line.

23. The non-transitory computer-readable medium of claim 22, wherein the template includes one or more sections corresponding to respective events of the story line.

24. The non-transitory computer-readable medium of claim 10, wherein the template configuration includes a theme.

25. A system comprising:
a memory device configured to store a sequence of digital video frames and images of a plurality of machine-readable identifiers;
a data processor communicatively coupled with the memory device, the data processor configured to perform operations comprising:
access the sequence of digital video frames, wherein the accessed sequence of digital video frames corresponds to a section of a template, the template configured to provide guidance for recording content relating to successive events, wherein the accessed sequence of digital video frames includes a machine-readable identifier from among the plurality of machine-readable identifiers that is embedded in and is descriptive of the sequence of digital video frames such that the embedded machine-readable identifier corresponds to the section of the template;
read the embedded machine-readable identifier;
associate the accessed sequence of digital video frames to the section of the template to which the read machine-readable identifier corresponds; and
process the content of the associated sequence of digital video frames in accordance with one or more predetermined criteria associated with the read machine-readable identifier.

26. The system of claim 25, wherein the data processor is further configured to
generate the machine-readable identifier; and
provide the generated machine-readable identifier for including in the sequence of digital video frames.

27. The system of claim 25, wherein to read the machine-readable identifier the data processor is configured to
scan each frame in the sequence of digital video frames;
compare an image of the scanned frame with a stored image of the machine-readable identifier; and
in response to a determination that the image of the scanned frame matches the stored image, assign the scanned image as the machine-readable identifier included in the sequence of digital video frames.

28. The system of claim 25, wherein the machine-readable identifier includes at least one of a bar code, a text, a number, an image, an audio signal, and an alphanumeric character.

29. The system of claim 25, wherein the machine-readable identifier is positioned at an arbitrary point in the sequence of digital video frames.

30. The system of claim 25, wherein to process the content of the associated sequence of digital video frames the data processor is configured to arrange the sequence of digital video frames relative to other processed sequences of digital video frames.

31. The system of claim 25, wherein to process the content of the associated sequence of digital video frames the data processor is configured to store the sequence of digital video frames in a repository hosted on the memory device.

32. The system of claim 25, wherein to process the content of the associated sequence of digital video frames the data processor is configured to edit the sequence of digital video frames.

33. The system of claim 25, wherein a template configuration includes a story line.

34. The system of claim 33, wherein the template includes one or more sections corresponding to respective events of the story line.

35. The system of claim 25, wherein the template configuration includes a theme.

* * * * *

UNITED STATES PATENT AND TRADEMARK OFFICE
CERTIFICATE OF CORRECTION

| | | |
|---|---|---|
| PATENT NO. | : 7,929,766 B2 | |
| APPLICATION NO. | : 11/760713 | |
| DATED | : April 19, 2011 | |
| INVENTOR(S) | : Marinkovich et al. | |

It is certified that error appears in the above-identified patent and that said Letters Patent is hereby corrected as shown below:

In column 6, line 36, delete ""First half"" and insert -- "First half," --, therefor.

Signed and Sealed this
Twenty-ninth Day of November, 2011

David J. Kappos
*Director of the United States Patent and Trademark Office*